US005204020A

United States Patent [19]

Suzuki et al.

[11] Patent Number: 5,204,020

[45] Date of Patent: Apr. 20, 1993

[54] LIQUID CRYSTAL COMPOUNDS

[75] Inventors: Yoshiichi Suzuki; Hiroyuki Mogamiya; Ichiro Kawamura, all of Tokyo, Japan

[73] Assignee: Showa Shell Sekiyu K.K., Tokyo, Japan

[21] Appl. No.: 875,609

[22] Filed: Apr. 29, 1992

Related U.S. Application Data

[63] Continuation of Ser. No. 305,127, Feb. 2, 1989, abandoned.

[30] Foreign Application Priority Data

Feb. 2, 1988 [JP] Japan ................................ 63-21159
Feb. 2, 1988 [JP] Japan ................................ 63-21160

[51] Int. Cl.$^5$ ...................... C09K 19/20; C09K 19/54; C07C 69/76

[52] U.S. Cl. ............................ 252/299.67; 252/299.5; 252/299.01; 560/65; 560/76; 560/102; 568/631; 568/647

[58] Field of Search ..................... 252/299.67; 560/65, 560/102, 76; 568/631, 647

[56] References Cited

U.S. PATENT DOCUMENTS

| | | | |
|---|---|---|---|
| 4,917,817 | 4/1990 | Nohira et al. | 252/299.01 |
| 4,917,821 | 4/1990 | Mori et al. | 252/299.63 |
| 4,918,213 | 4/1990 | Nohira et al. | 558/271 |
| 4,921,632 | 5/1990 | Nakamura et al. | 252/299.1 |

FOREIGN PATENT DOCUMENTS

| | | |
|---|---|---|
| 294852 | 12/1988 | European Pat. Off. . |
| 8707890 | 12/1987 | World Int. Prop. O. . |

OTHER PUBLICATIONS

H. Tanguchi et al, "Electrical and Optical Properties of Florinated Ferroelectric Liquid Crystal", *Japanese Journal of Applied Physics,* vol. 26, Part 1, Supplement 26-2, 1987, pp. 101-103.

K. Yoshino et al, "Florinated Ferroelectric Liquid Crystal and its Dielectric Property", Chemistry Express, vol. 2, No. 1, 1987, pp. 53-56.

*Primary Examiner*—Robert L. Stoll
*Assistant Examiner*—C. Harris
*Attorney, Agent, or Firm*—Sughrue, Mion, Zinn, Macpeak & Seas

[57] ABSTRACT

Liquid crystal compounds represented by the formula;

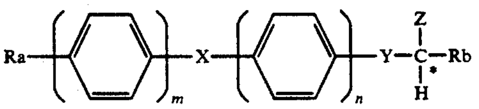

in which Ra means an alkyl group of 1-20 carbon atoms or an alkoxy group of 1-20 carbon atoms; Rb means an aliphatic alkyl group, a branched alkyl group or an aralkyl group respectively of 1-20 carbon atoms, an alkoxy group of 1-20 carbon atoms, or an alkanoyl methyl group having 1-20 carbon atoms in the alkyl;

X means $-\overset{O}{\overset{\|}{C}}O-$ or $-O\overset{O}{\overset{\|}{C}}-$; Y means $-\overset{O}{\overset{\|}{C}}O-$ or $-O\overset{O}{\overset{\|}{C}}-$;

Z means a fluorinated alkyl or a fluorinated haloalkyl; m is an integer of from 1 to 3; n is an integer of from 0 to 2 where when n is 0, Y is a single bond; and * shows an optically active center, which have a larger spontaneous polarization, high speed of response and good orientation, and show tristable liquid crystal phase.

1 Claim, 12 Drawing Sheets

LIQUID CRYSTAL COMPOUNDS

This is a continuation of application Ser. No. 07/305,127 filed Feb. 2, 1989, abandoned.

BACKGROUND OF THE INVENTION AND RELATED ART

The invention relates to new ferroelectric or high dielectric, chiral smectic liquid crystal compounds to be used for a display element or an electrooptical element, with utilizing the particular property that the molecular orientation thereof can be controlled in an electric field.

The liquid crystal display element has been widely used for various purposes as well known owing to desired properties thereof such as low electric tension workability, low electric energy consumption, displayability in a thin form, and light recepting type causing less eyestrain.

A liquid crystal display device of twisted nematic (TN) type is, however, not satisfactory in that the speed of response is too slow in comparison with display devices of light emitting type such as a cathode ray tube (CRT) so that use thereof is rather restricted for that purpose.

As an improvement of said property of such nematic liquid crystals, R. B. Meyer et al succeeded in the year of 1975 to synthesize decylooxybenzylidene-amino-2-methylbutyl cinamates (DOBAMBC) as ferroelectric liquid crystals. In the year of 1980, Clark and Lagawall found and confirmed a high speed switching property in the order of a microsecond of the DOBAMBC thin film cell.

These ferroelectric chiral smectic liquid crystals have a high speed of response about 100 times that of the nematic ones conventional since then as well as good bistability so as to be applied to various display devices for moving pictures such as TV, high speed photoshutters and so on.

It is necessary as the ferroelectric liquid crystal, to have spontaneous polarization which is inversible by an electric field, chiral molecular structure, particular smectic layer and a dipole moment component in the vertical direction to the line of apsides of the liquid crystal molecule.

Followings have been known in relation thereto regarding how to make molecular designs in order to obtain liquid crystals having not only high dielectricity but also large spontaneous polarization;

(1) Since the rotation of liquid crystal molecule about the line of apsides may reduce efficient orientation degree of dipole moment so that spontaneous polarization is resultingly made smaller, it is effective to supress the molecule free rotation. For that purpose, it is possible to introduce a bulky atomic or molecular group in the vicinity of an asymmetric carbon atom.

(2) It may be a direct method for obtaining large spontaneous polarization to cause large dipole moment in the vicinity of the asymmetric carbon atom, for which an atomic or molecular group of fluorine such as $CF_3$ is directly introduced at the asymmetric carbon atom.

SUMMARY OF THE INVENTION

The inventors have tried to make further improvements of liquid crystal compounds of the type referred to above based on the above known findings to succeed in manufacturing a series of new liquid crystal compounds having not only a larger and physicochemically stable spontaneous polarization but also a higher speed of response, by directly introducing an atomic or molecular group comprising fluorine of high electronegativity to the asymmetric carbon atom so as to enlarge the dipole moment of the liquid crystal molecule and simultaneously raising three-dimensional interaction between the asymmetric carbon atom and the polar group of a carbonyl bond adjacent to the asymmetrical carbon atom.

It has been found that the above new liquid crystal compounds may show tristability in molecular orientation fundamentally different from bistability in the conventional liquid crystal compounds of this sort so as to give optical response of tristable state to the applied electric field.

The series of new liquid crystal compounds according to the invention are represented by a formula;

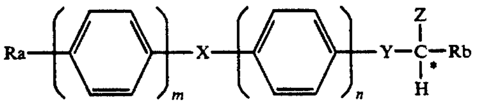

in which Ra means an alkyl group of 1-20 carbon atoms or an alkoxy group of 1-20 carbon atoms; Rb means an aliphatic alkyl group, a branched alkyl group or an aralkyl group respectively of 1-20 carbon atoms, an alkoxy group of 1-20 carbon atoms or an alkanoyl methyl group of 1-20 carbon atoms;

$$-\overset{O}{\overset{\|}{C}}O- \text{ or } -O\overset{O}{\overset{\|}{C}}-; \text{ y means } -\overset{O}{\overset{\|}{C}}O- \text{ or } -O\overset{O}{\overset{\|}{C}}-;$$

Z means a fluoroalkyl or a halogen substituted fluoroalkyl; m is an integer of from 1 to 3; n is an integer of from 0 to 2 where when n is 0, Y is a single bond; and * shows an optically active center.

BRIEF DESCRIPTION OF THE DRAWINGS

In the accompanying drawings, FIGS. 1-12 respectively show infrared absorption spectra of the various liquid crystal compounds according to the invention.

DESCRIPTION OF PREFERRED EMBODIMENTS OF THE INVENTION

Figure 1:
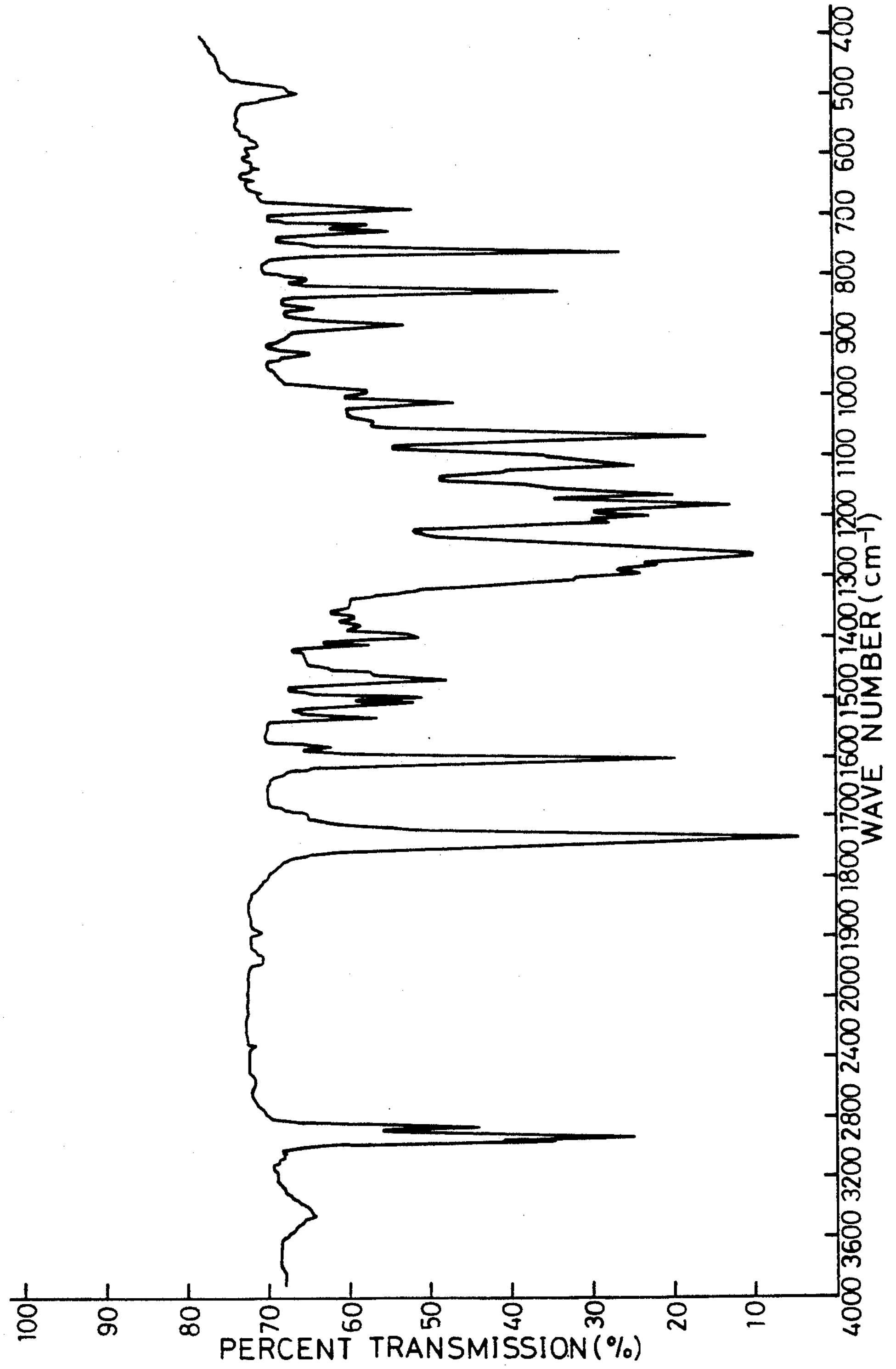

In the formula of the liquid crystal compounds of the invention, Ra means an alkyl group or an alkoxy group respectively of 1-20 carbon atoms as referred to above, and preferably the alkyl group of 3-16 carbon atoms and the alkoxy group of 3-16 carbon atoms.

Rb therein means an aliphatic alkyl, branched alkyl, aralkyl, alkoxy or alkanoyl methyl group respectively of 1-20 carbon atoms as referred to above, and preferably of 3-16 carbon atoms, which are in the alkyl position in case of the alkanoyl methyl group, e.g. hexyl, isobutyl, benzyl, substituted benzyl and phenethyl residue.

Z in the formula means a fluoroalkyl or a halogenated fluoroalkyl group as referred to above, and preferably $CF_3$, $CHF_2$, $CH_2F$, $C_2F_5$, $CClF_2$, $CCl_2F$, $CCl_3$, $CF_3CCl_2$, $C_3F_7$ or the like.

Typical groups represented by

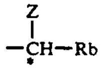

in the above formula of the objective compounds of the invention mean a residue of the following respective compound from which OH-group is removed:
1,1,1-trifluoro-2-$C_3$-$C_{16}$ alkanol,
1,1-difluoro-2-$C_3$-$C_{16}$ alkanol,
1-monofluoro-2-$C_3$-$C_{16}$ alkanol,
1,1,1,2,2-pentafluoro-2-$C_3$-$C_{16}$ alkanol,
1-monofluoro-1,1-dichloro-2-$C_3$-$C_{16}$ alkanol,
1,1,1-trichloro-2-$C_3$-$C_{16}$ alkanol,
1,1-difluoro-1-monochloro-2-$C_3$-$C_{16}$ alkanol,
1,1,1-trifluoro-2-phenyl-2-ethanol,
1,1,1-trifluoro-3-phenyl-2-propanol or
1,1,1-trifluoro-4-phenyl-2-butanol Typical groups represented by a formula;

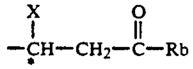

mean a residue of the following respective compound from which OH-group is removed:
1,1,1-trifluoro-3-pentanoly-2-propanol,
1,1,1-trifluoro-3-hexanolyl-2-propanol,
1,1,1-trifluoro-3-heptanoly-2-propanol,
1,1,1-trifluoro-3-octanoyl-2-propanol,
1,1,1-trifluoro-3-nonanoyl-2-propanol,
1,1,1-trifluoro-3-decanoyl-2-propanol,
1,1,1-trifluoro-3-undecanoyl-2-propanol,
1,1,1-trifluoro-3-dodecanoyl-2-propanol,
1,1,1-trifluoro-3-(3-methylbutanoyl)-2-propanol,
1,1,1-trifluoro-3-(3-phenylpropanoyl)-2-propanol,
1,1,1-trifluoro-3-(2-phenylethanoyl)-2-propanol,
1,1,1-trifluoro-3-benzoyl-2-propanol, Preferable liquid crystal compounds according to the invention of the formula referred to in the beginning are;

In case wher m = 1 and n = 1,

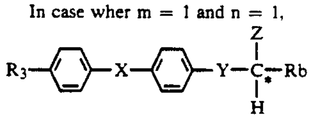

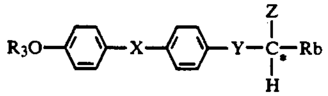

In case where m = 2 and n = 1,

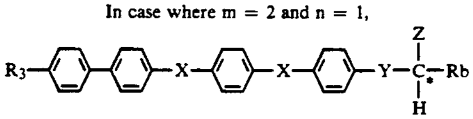

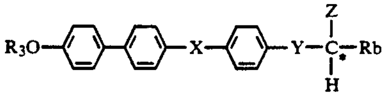

In case where m = 1 and n = 2,

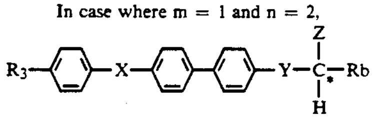

-continued

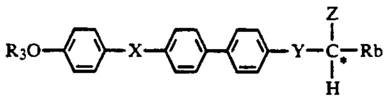

In case where m = 2 nad n = 2,

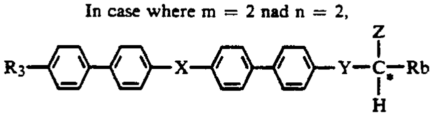

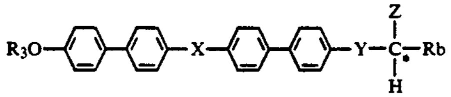

In case where m = 2 and n = 0,

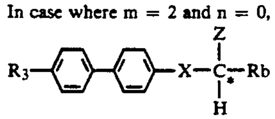

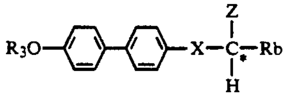

In case where m = 3 and n = O,

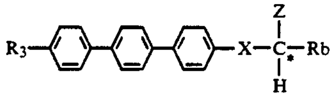

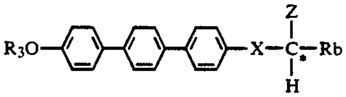

In said formulae, $R^3$ means an alkyl group of 3-16 carbon atoms, and X, Y, Z and Rb are each same with the above.

More preferable compounds among the above are;

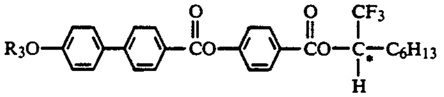

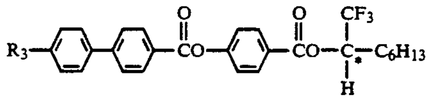

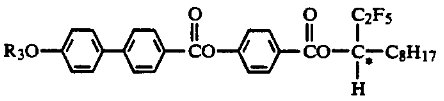

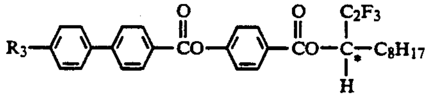

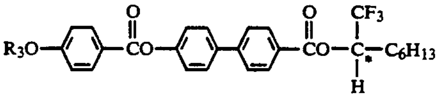

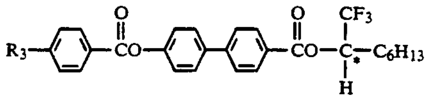

-continued

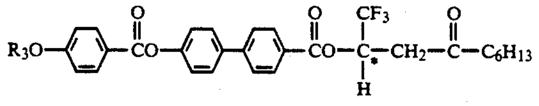

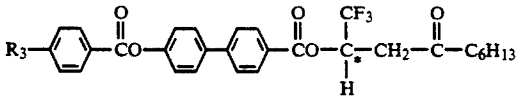

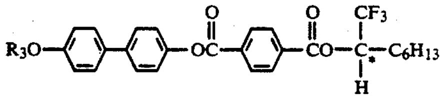

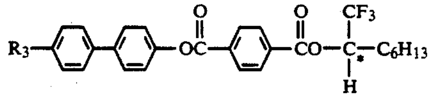

In said formula, $R^3$ means the above just referred to.

The liquid crystal compounds of the invention may be manufactured for instance as follows.

Firstly, 4-benzyloxbenzoic acid chloride is reacted with an 1,1,1-trifluoro-2-alkanol to obtain a 1,1,1-trifluoro-2-alkyl-4-benzyloxybenzoate, which is then hydrogenated to obtain 1,1,1-trifluoro-2-alkyl-4-hydroxybenzoate. The obtained hydroxy alkyl ester is reacted with a 4-n-alkyloxyphenyl (or biphenyl) carboxylic acid chloride to obtain an objective compound, 4-(1,1,1-trifluoro-2-alkoxycarbonyl)phenyl-4'-n-alkoxybiphenyl-4-carboxlate.

It is also possible to react a 1,1,1-trifluoro-2-alkyl-4-hydroxybenzoate with a 4-n-alkyloxyphenyl (or biphenyl) carboxylic acid in a solvent such as diethyl ether and tetrahydrofuran, in the presence of a catalyst such as N,N-dimethylaniline, 4-pyrrolidinopyridine etc. and a condensing agent such as dicyclohexylcarbodiimide, N,N-carbonyl diimidazole etc.

The liquid crystal compounds of the invention may be obtained also as follows.

4-benzyloxybenzoic acid chloride is reacted with a (3,3,3-trifluoro-2-hydroxy)propyl-n-alkylketone to obtain 1,1,1-trifluoro-3-alkanoyl-2-propyl-4-benzyloxybenzoate, which is then hydrogenated to obtain 1,1,1-trifluoro-3-alkanoyl-2-propyl-4-hydroxybenzoate. The obtained hydroxy propyl ester is reacted with a 4-n-alkyloxyphenyl (or biphenyl) carboxylic acid chloride to obtain an objective compound, 4-(1,1,1-trifluoro-3-alkanoyl-2-propyloxycarbonyl)-phenyl-4'-n-alkanoylbenzoate.

The objective compounds of the invention may be obtained further by a following process. Terephthalic acid chloride is reacted with an 1,1,1-trifluoro-2-alkanol to obtain an 4-(1,1,1-trifluoro-2-alkyloxycarbonyl)benzoic acid chloride, which is then reacted with a 4-alkyloxy-4'-hydroxybiphenyl to obtain an objective compound, 4-n-alkoxy-4'-biphenyl 4-(1,1,1-trifluoro-2-alkoxycarbonyl)-4-benzoate.

The liquid crystal compounds of the invention are explained in more detail in reference to the following Examples.

EXAMPLE 1

1) Synthesis of 1,1,1-trifluoro-2-octyl-4-benzyloxybenzoate

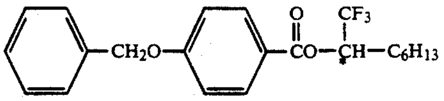

4.3 g of 4-Benzyloxybenzoic acid chloride was dissolved in 50 ml of methylene chloride to prepare a solution to which a solution of 2.9 g of (+)-1,1,1-trifluoro-2-octanol, 0.6 g of dimethylaminopyridine and 1.7 g of triethylamine in 50 ml of methylene chloride was droppingly and gradually added under ice cooling. The mixture at the room temperature was reacted for 24 hours and then taken in ice water to be extracted with methylene chloride. The methylene chloride phase was successively washed with diluted hydrochloric acid, water, 1N aqueous sodium carbonate solution and water in this order, dried above magnsium sulfate and distilled for removing the solvent to obtain the crude objective compound, which was purified by toluene/silica gel chromatography and recrystallization with ethanol to obtain the objective crystal liquid compound in the amount of 3.8 g.

2) Synthesis of 1,1,1-trifluoro-2-octyl-4-hydroxybenzoate

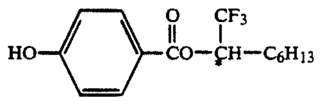

The compound obtained in the above was dissolved in 100 ml of methanol to which 0.4 g carbon carried with 10% Pd was added, and the mixture was subjected to hydrogenation in an atmosphere of hydrogen to obtain the objective compound in the amount of 2.8 g.

3) Synthesis of 4-(1,1,1-trifluoro-2-octyloxycarbonyl)-phenyl-4'-n-hexyloxybiphenyl-4-carboxylate

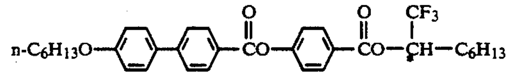

After heating 3.0 g of 4-n-hexyloxydiphenyl carboxylic acid and an excessive amount of thionyl chloride under reflux for 6 hours, unreacted thionyl chloride was distilled off to obtain 4-n-hexyloxydiphenyl carboxylic acid chloride.

The acid chloride was taken in 50 ml of methylene chloride to prepare a solution, to which a solution of 2.8 g of 1,1,1-trifluoro-2-octyl-4-hydroxybenzoate obtained in the above, 1.0 g of triethylamine and 0.3 g of dimethylaminopyridine in 50 ml of methylene chloride was droppingly and gradually added under ice cooling to be reacted at the room temperature for 24 hours. The reaction product was taken in ice water and extracted with methylene chloride. The methylene chloride phase was successively washed with diluted hydrochloric acid, water, 1N aqueous solution of sodium carbonate and water in this order, dried above sodium sulfate and subjected to distillation for removing the solvent to obtain the crude objective product, which was purified by toluene/silica gel chromatography to obtain the objective product in the amount of 2.1 g, which was further purified by recrystallization with absolute ethanol to be subjected to measurement of phase transition points etc. of which result is shown later.

Furthermore, $S^*(3)$ represents chiral smectic phase showing the tristable state.

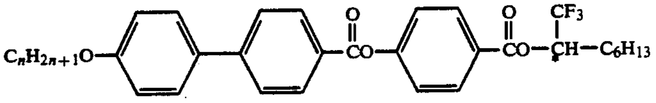

n = 6 $Cry \underset{104.7}{\overset{100}{\rightleftharpoons}} S^*(3) \xleftarrow{126.0} S_C^*(2) \underset{126.5}{\overset{128}{\rightleftharpoons}} S_A \underset{144}{\overset{142.2}{\rightleftharpoons}} Iso$ n = 8 $Cry \underset{74}{\overset{80}{\rightleftharpoons}} S^*(3) \xleftarrow{114} S_C^*(2) \xleftarrow{115} S_A \underset{123.4}{\overset{123.3}{\rightleftharpoons}} Iso$ n = 9 $Cry \underset{40.4}{\overset{67.2}{\rightleftharpoons}} S^*(3) \underset{106.2}{\overset{107}{\rightleftharpoons}} S_C^*(2) \underset{110.3}{\overset{111}{\rightleftharpoons}} S_A \underset{114.9}{\overset{115.6}{\rightleftharpoons}} Iso$ n = 10 $Cry \underset{25.5}{\overset{30}{\rightleftharpoons}} S^*(3) \xleftarrow{102.7} S_C^*(2) \underset{103}{\overset{104.6}{\rightleftharpoons}} S_A \underset{107.5}{\overset{109.2}{\rightleftharpoons}} Iso$ n = 11 $Cry \underset{14}{\overset{39}{\rightleftharpoons}} S^*(3) \underset{100}{\overset{101}{\rightleftharpoons}} S_A \underset{104.3}{\overset{104.2}{\rightleftharpoons}} Iso$ n = 12 $Cry \underset{26.5}{\overset{61.2}{\rightleftharpoons}} S^*(3) \underset{97.0}{\overset{98.4}{\rightleftharpoons}} S_A \underset{100.4}{\overset{101.2}{\rightleftharpoons}} Iso$

EXAMPLES 2–6

Instead of 4-n-hexyloxybiphenyl carboxylic acid used in Example 1-(3), 2. 4-n-octyloxybiphenyl carboxylic acid,
3. 4-n-nonyloxybiphenyl carboxylic acid,
4. 4-n-decyloxybiphenyl carboxylic acid,
5. 4-n-undecyloxybiphenyl carboxylic acid,
6. 4-n-dodecyloxybiphenyl carboxylic acid were respectively used to proceed with treatments just same as in Example 1 to obtain following objective compounds.

2. 4-(1,1,1-trifluoro-2-octyloxycarbonyl)-phenyl-4'-n-octyloxybiphenyl-4-carboxylate

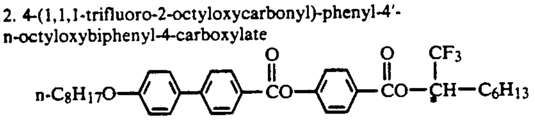

3. 4-(1,1,1-trifluoro-2-octyloxycarbonyl)-phenyl-4'-n-nonyloxybiphenyl-4-carboxylate

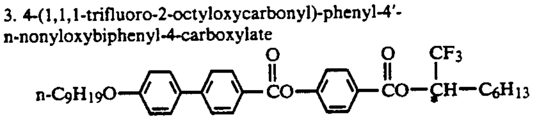

4. 4-(1,1,1-trifluoro-2-octyloxycarbonyl)-phenyl-4'-n-decyloxybiphenyl-4-carboxylate

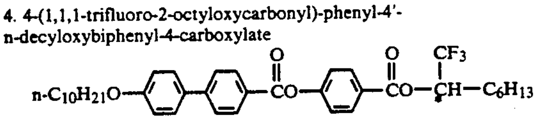

5. (4-(1,1,1-trifluoro-2-octyloxycarbonyl)-phenyl-4'-n-undecyloxybiphenyl-4-carboxylate

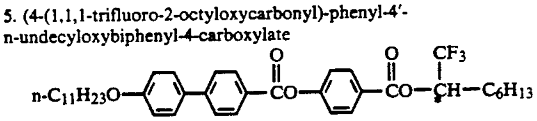

6. 4-(1,1,1-trifluoro-2-octyloxycarbonyl)-phenyl-4'-n-dodecyloxybiphenyl-4-carboxylate

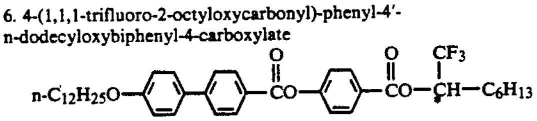

The liquid crystal compounds referred to above, which may be represented by the following formula, have tristable phase transition points (°C.) as follows.

The nuclear magnetic resonance spectra of the above liquid crystal compounds according to the invention are as shown in Tables 1–5 at the end of the specification and before the Claims.

The infrared absorption spectra (KBr) of the above liquid crystal compounds of the invention are

Figure 2:
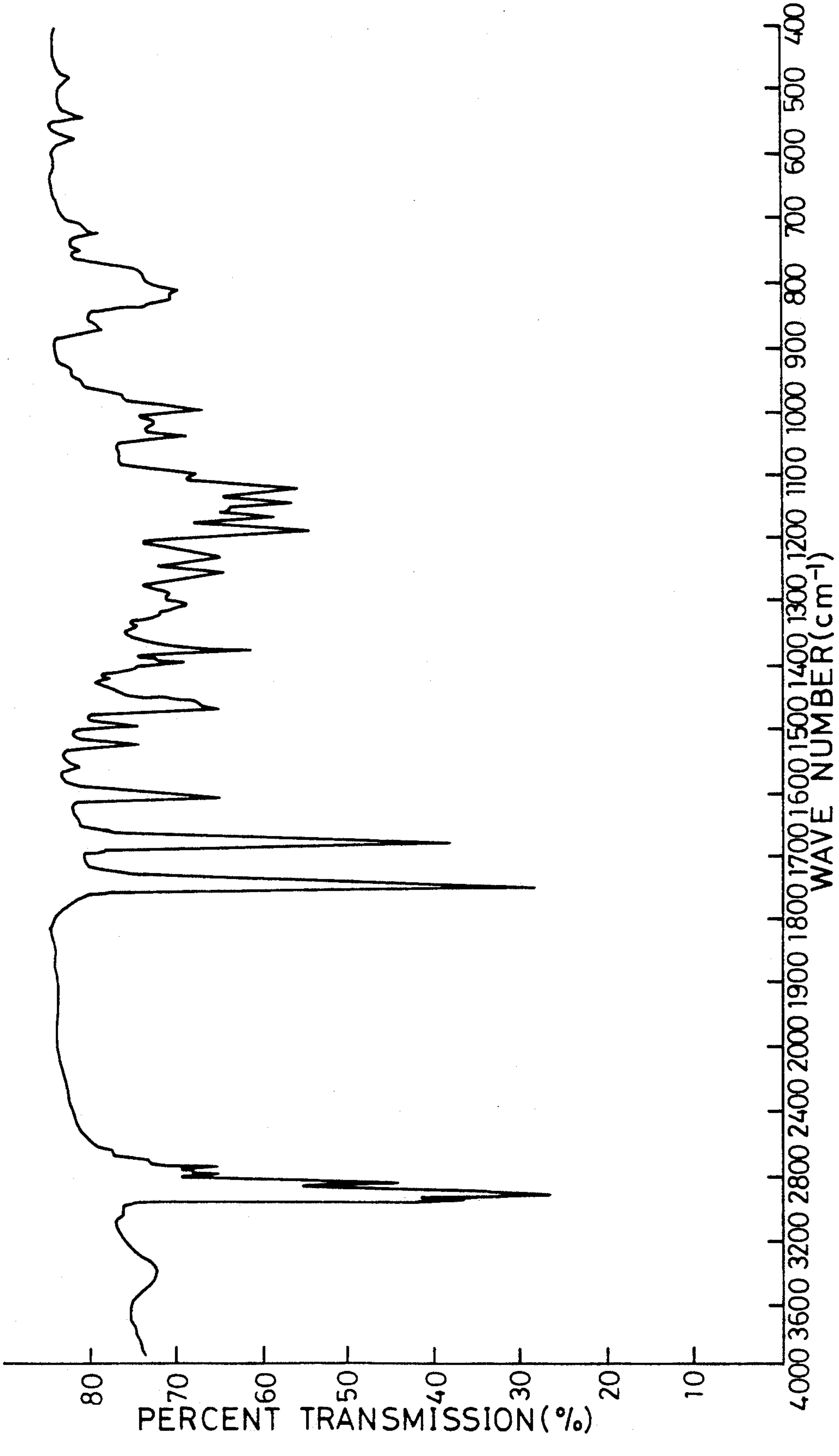
Figure 3:
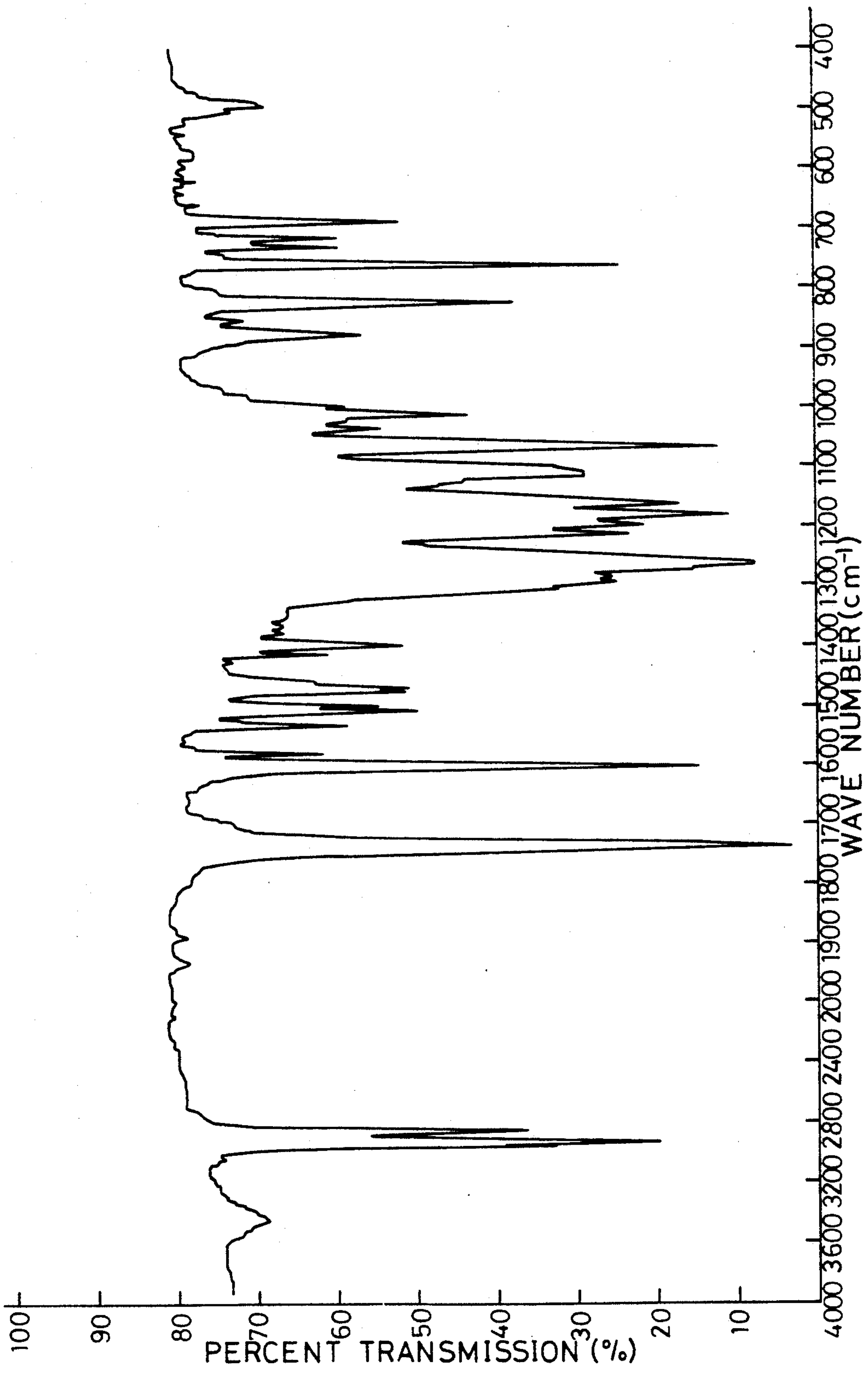
Figure 4:
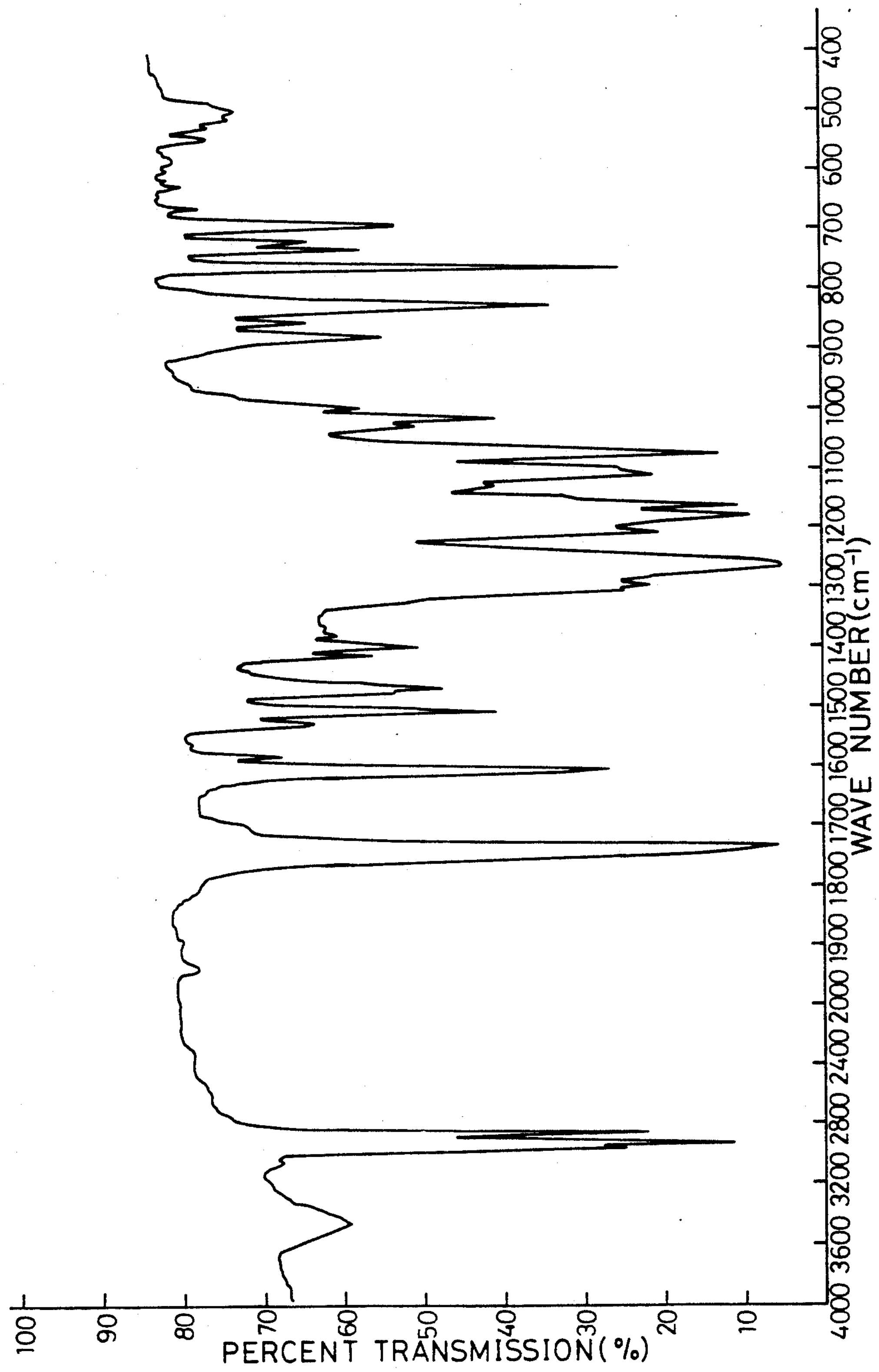
Figure 5:
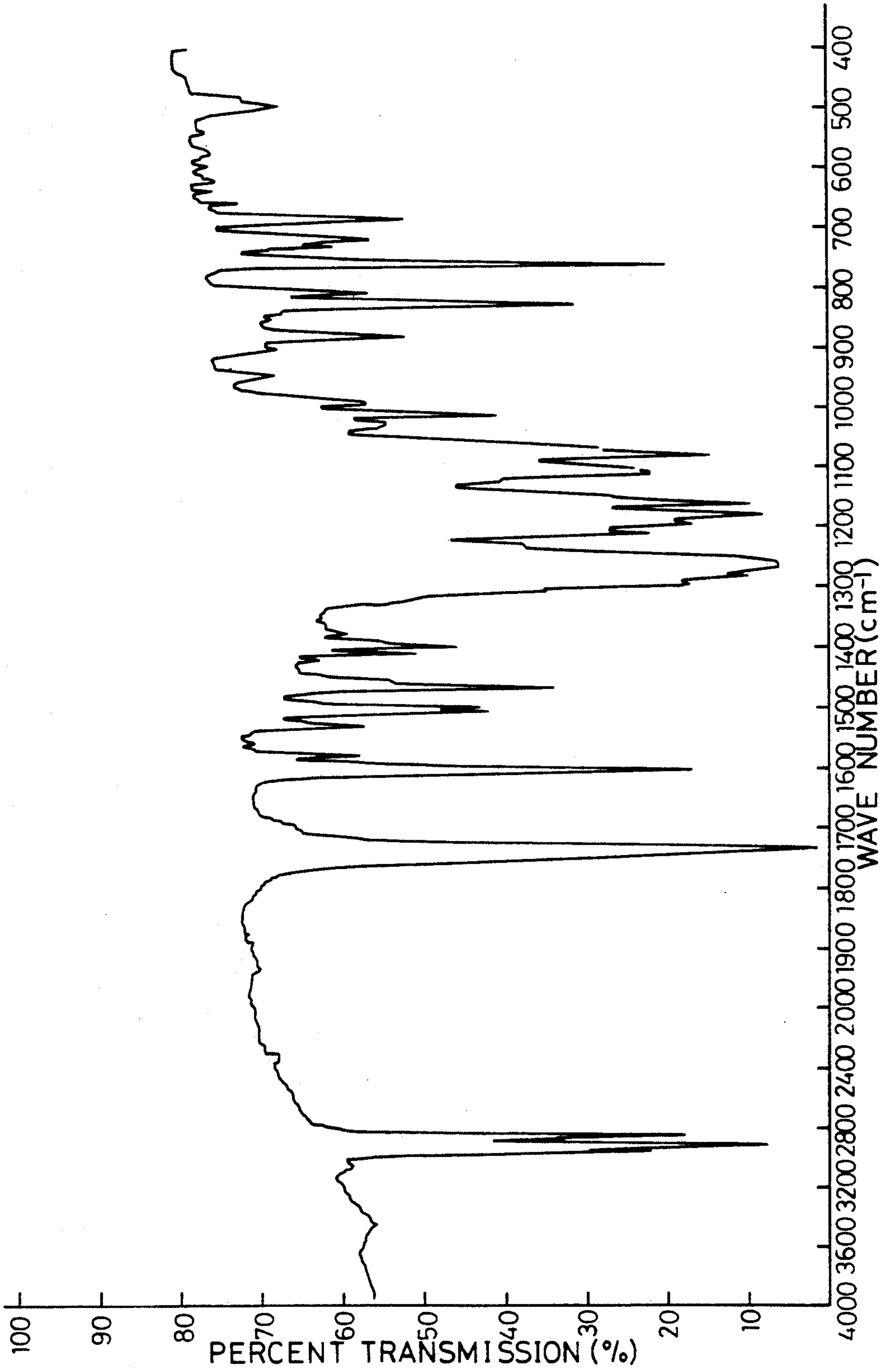
Figure 6:
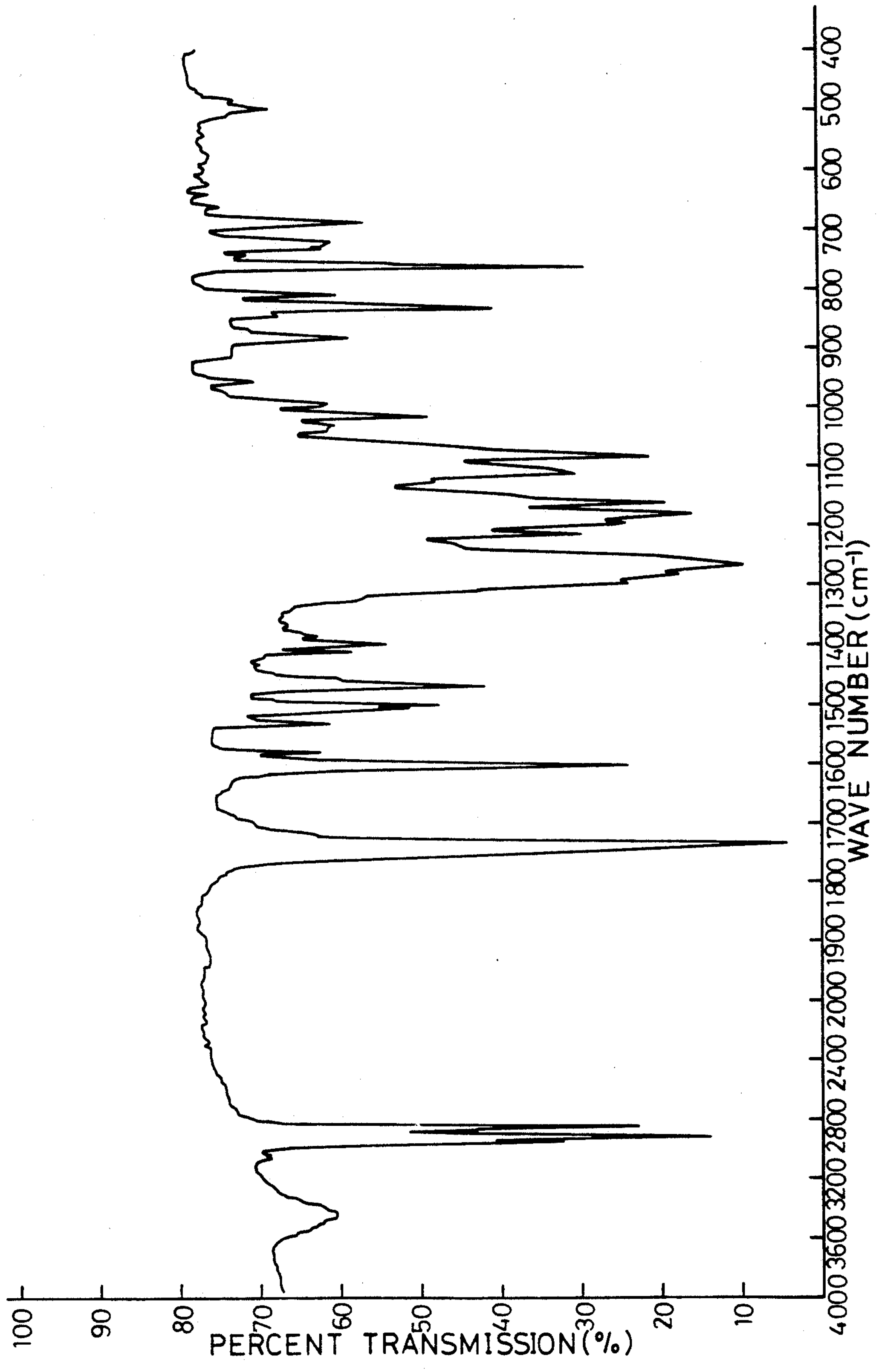

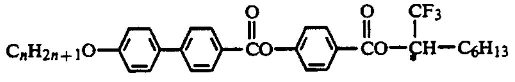

shown in FIG. 1 (n=6), FIG. 2 (n=8), FIG. 3 (n=9), FIG. 4 (n=10), FIG. 5 (n=11) and FIG. 6 (n=12).

EXAMPLE 7

1) Synthesis of 1,1,1-trifluoro-3-heptanoyl-2-propyl-4-benzyloxybenzoate

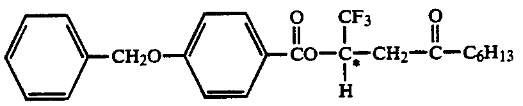

16 g of 4-Benzyloxybenzoic acid chloride was taken in 100 ml of methylene chloride to prepare a solution, to which 10 g of (+)-(3,3,3-trifluoro-2-hydroxy) propyl-n-hexyl ketone, 5.2 g of pyridine and 8 g of dimethylaminopyridine were added under ice cooling. The reaction product at the room temperature was reacted for 24 hours, taken in ice water and extracted with methylene chloride. The methylene chloride phase was seccessively washed with diluted hydrochloric acid, water, 1N aqueous solution of sodium carbonate and water in this order and dried above magnesium sulfate. As a result of disillation for removing the solvent and subjecting to toluene/silica gel chromatography, the objective compound was obtained in the amount of 12 g.

2) Synthesis of 1,1,1-trifluoro-3-heptanoyl-2-propyl-4-hydroxybenzoate

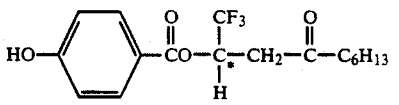

The compound obtained in the above in the amount of 12 g was dissolved in 100 ml of ethanol, to which 1.3 g of 10% palladium carried carbon was added, and the mixture was hydrogenated at the room temperature in hydrogen gas under pressure for 5 hours to obtain the objective compound in the amount of 10 g.

3) Synthesis of 4-(1,1,1-trifluoro-3-heptanoyl-2-propyloxycarbonyl)-phenyl-4-n-octyloxybenzoate

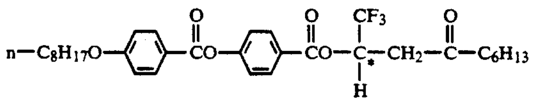

After heating 11 g of 4-n-octyloxybenzoic acid and an exessive amount of thionyl chloride under reflux for 6 hours, unreacted thionyl chloride was distilled off to obtain 4-n-octyloxybenzoic acid chloride.

To a solution of 10 g of 1,1,1-trifluoro-3-heptanoyl-2-propyl-4-hydroxybenzoate obtained in the above, 3.4 g of pyridine and 5.4 g of dimethylaminopyridine in 50 ml methylene chloride, a solution of 11 g of the above 4-n-octyloxybenzoic acid chloride in methylene chloride was added with stirring and ice cooling. The mixture at the room temperature was reacted for 24 hours, and the reaction product was taken in ice water and then extracted with methylene chloride. The methylene chloride phase was successively washed with diluted hydrochloric acid, water, 1N aqueous solution of sodium carbonate and water in this order, dried above magnesium sulfate and subjected to distillation for removing the solvent to obtain the crude objective compound, which was purified according to toluene/silica gel chromatography and recrystallization with ethanol to obtain the objective compound in the amount of 6 g. The compound was further purified by recrystallization with pure ethanol for measuring phase transition points etc.

This liquid crystal compound of the invention has tristable phase transition points (°C.) as follows.

$$Cry \underset{106}{\overset{95}{\rightleftharpoons}} S_mC^* \underset{141}{\overset{136}{\rightleftharpoons}} S_A \underset{208}{\overset{213}{\rightleftharpoons}} Iso$$

Figure 7:
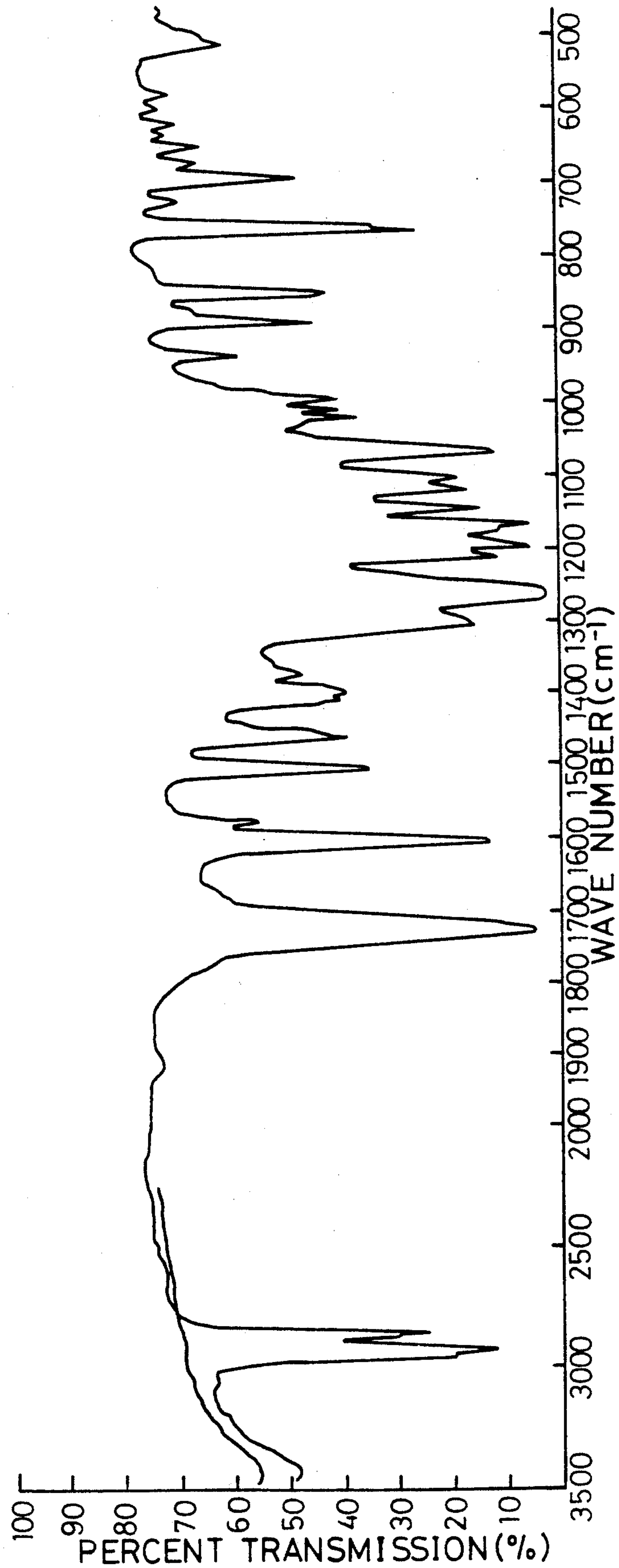

The infrared absorption spectrum thereof is shown in FIG. 7.

In lieu of 4-benzyloxybenzoic acid chloride in 1) of this Example, 4-benzyloxy-phenylbenzoic acid chloride was used for proceeding with the treatments just as referred to aboved to obtain the same objective compound, 4-(1,1,1-trifluoro-3-heptanoyl-2-propyloxycarbonyl)-phenyl-4-n-ocyloxybiphenyl-4-carboxylate.

EXAMPLE 8

1) Synthesis of 4-(1,1,1-trifluoro-2-octyloxy carbonyl)-benzoate

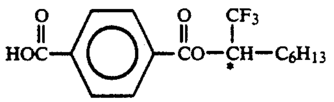

11.2 g of Terephthalic acid choride was dissolved in 50 ml of methylene chloride, to which 9.2 g of (+)-1,1,1-trifluoro-2-octanol, 13 g of pyridine and 6.1 g of dimethylaminopyridine were droppingly and gradually added under ice cooling. The mixture at the room temperature was reacted for 24 hours. The reaction product was successively washed with diluted hydrochloric acid, water, 1N aqueous solution of sodium carbonate and water in this order. The recovered organic phase was dried above magnesium sulfate and subjected to distillation for removing the solvent to obtain the crude product, which is purified according to toluene/silica gel chromatography to obtain the intermediate in the amount of 3.3 g.

2) Synthesis of 4-n-dodecyloxy-4'-biphenyl-4-(1,1,1-trifluoro-2-octyloxycarbonyl)benzoate

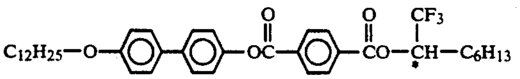

3.3 g of 4-(1,1,1-trifluoro-2-octyloxycarbonyl) benzoate obtained in the above, 3.9 g of 4-dodecyloxy-4'-hydroxybiphenyl, 3.1 g of dicyclohexylcarbodiimide and 0.3 g of dimethylaminopyridine were taken in 100 ml of tetrahydrofuran to be reacted at the room temperature for 24 hours.

The reaction product was subjected to vacuum distillation for removing some amount of the solvent, taken in ice water and extracted with methylene chloride. The methylene chloride phase was successively washed with diluted hydrochloric acid, water 1N aqueous solution of sodium carbonate, and water in this order so as to be neutral, dried above sodium sulfate and distilled for removing the solvent to obtain the crude objective compound, which was then treated according to toluene/silica gel chromatography and repeated recrystallizations with ethanol to obtain the objective compound in the amount of 1.4 g.

The objective compound as liquid crystal has following tristable phase transition points.

$$Cry \xleftarrow{42.0} S_C^* \xleftarrow{76.1} S_A \xleftarrow{112.0} Iso$$

Figure 8:
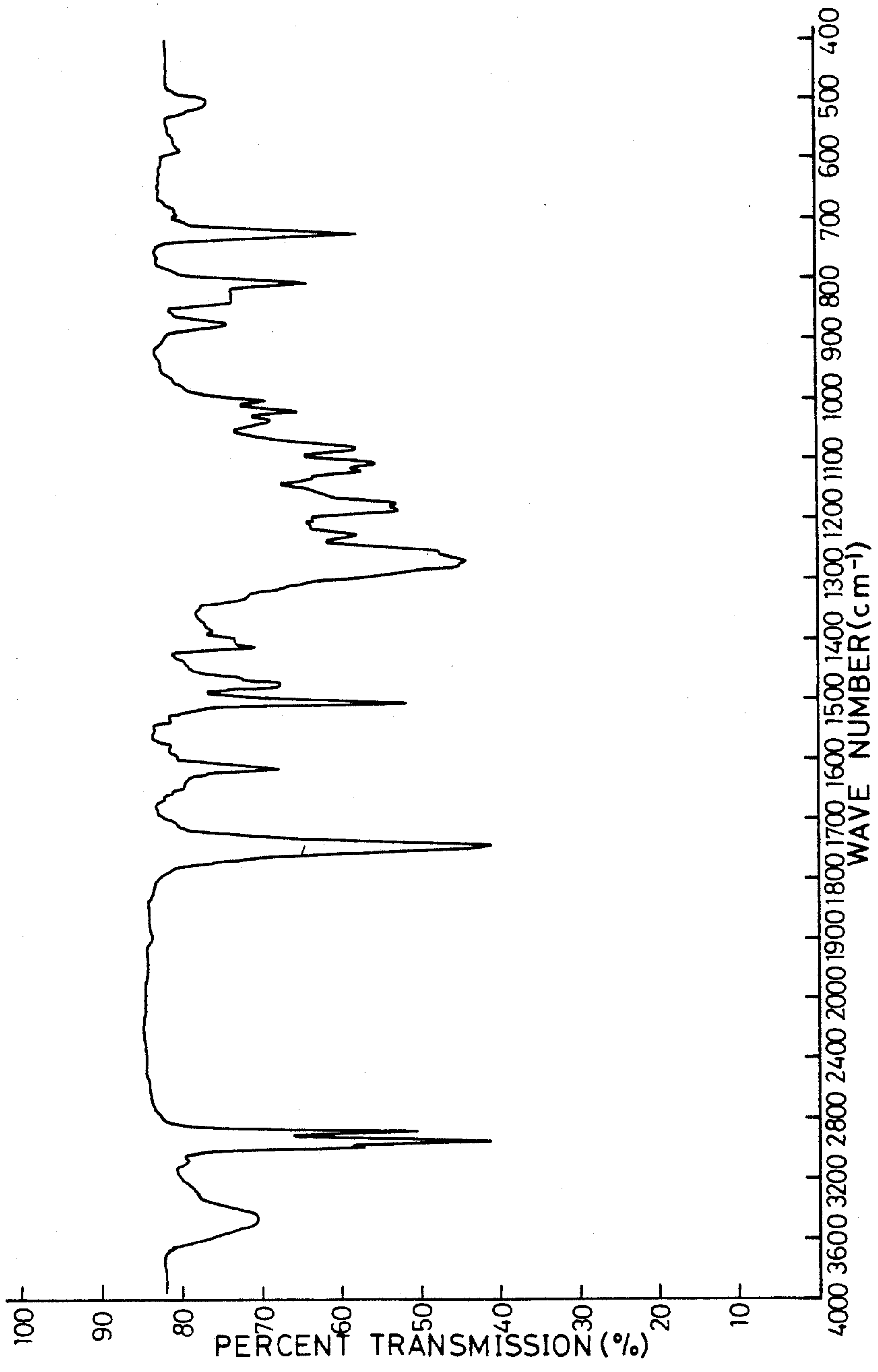
Figure 9:
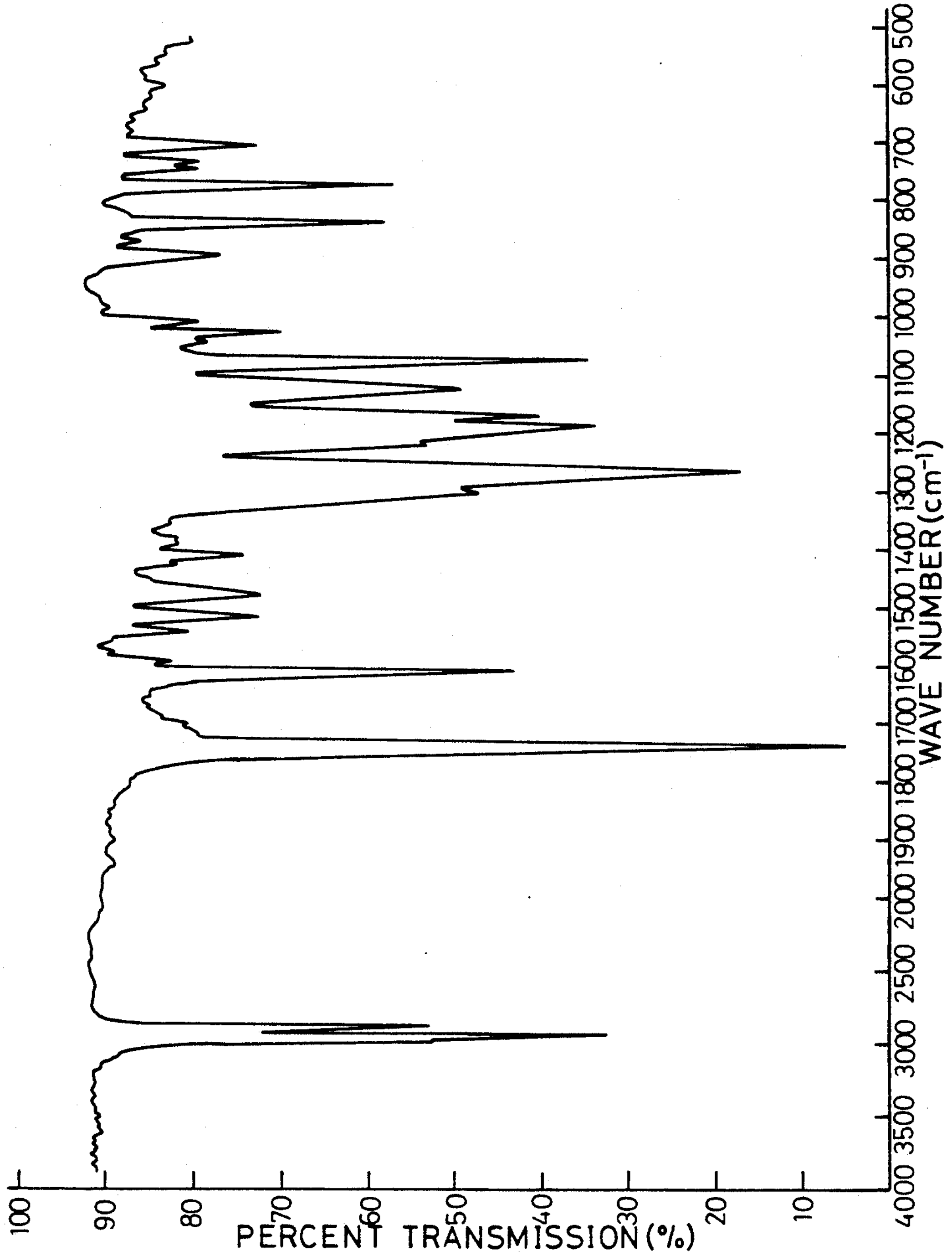

A infrared absorption spectrum thereof is shown in FIG. 8.

EXAMPLE 9

Synthesis of 4-(1,1,1-trifluoro-2-octyloxycarbonyl)-phenyl-4'-n-octylbiphenyl-4-carboxylate

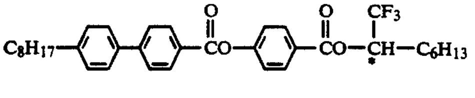

Instead of 4-n-hexyloxybiphenyl-4'-carboxylic acid used in Example 1-(3), 4-n-octylbiphenyl-4'-carboxylic acid was used here and the other treatments were carried out just same as in Example 1 to obtain the objective liquid crystal compound as above.

The above compound showed tristable phase transition points as follows.

$$Cry \underset{24.5}{\overset{46.0}{\rightleftharpoons}} S_{(3)}^{*} \underset{74.0}{\overset{74.0}{\rightleftharpoons}} S_C^{*} \underset{75.4}{\overset{76.8}{\rightleftharpoons}} S_A \underset{79.2}{\overset{79.1}{\rightleftharpoons}} Iso$$

A nuclear magnetic resonance spectrum thereof is shown in Table 6.

EXAMPLE 10

Synthesis of 4-(1,1,1-trifluoro-2-decyloxycarbonyl)-phenyl-4'-n-octyloxybiphenyl-4-carboxylate

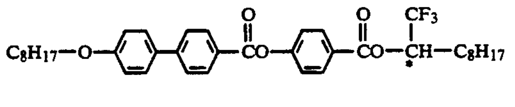

Instead of (+)-1,1,1-trifluoro-2-octanol used in Example 1-(1),(+)-1,1,1-trifluoro-2-decanol was used here and the other treatments were carried out just same as in Example 1 to obtain the objective compound as above.

This compound of the invention also showed tristable phase transition points as follows.

$$Cry \xleftarrow[57.0]{} S(3)^{*} \xleftarrow[103.0]{} S_C^{*} \xleftarrow[103.5]{} S_A \xleftarrow[114.0]{} Iso$$

Figure 10:
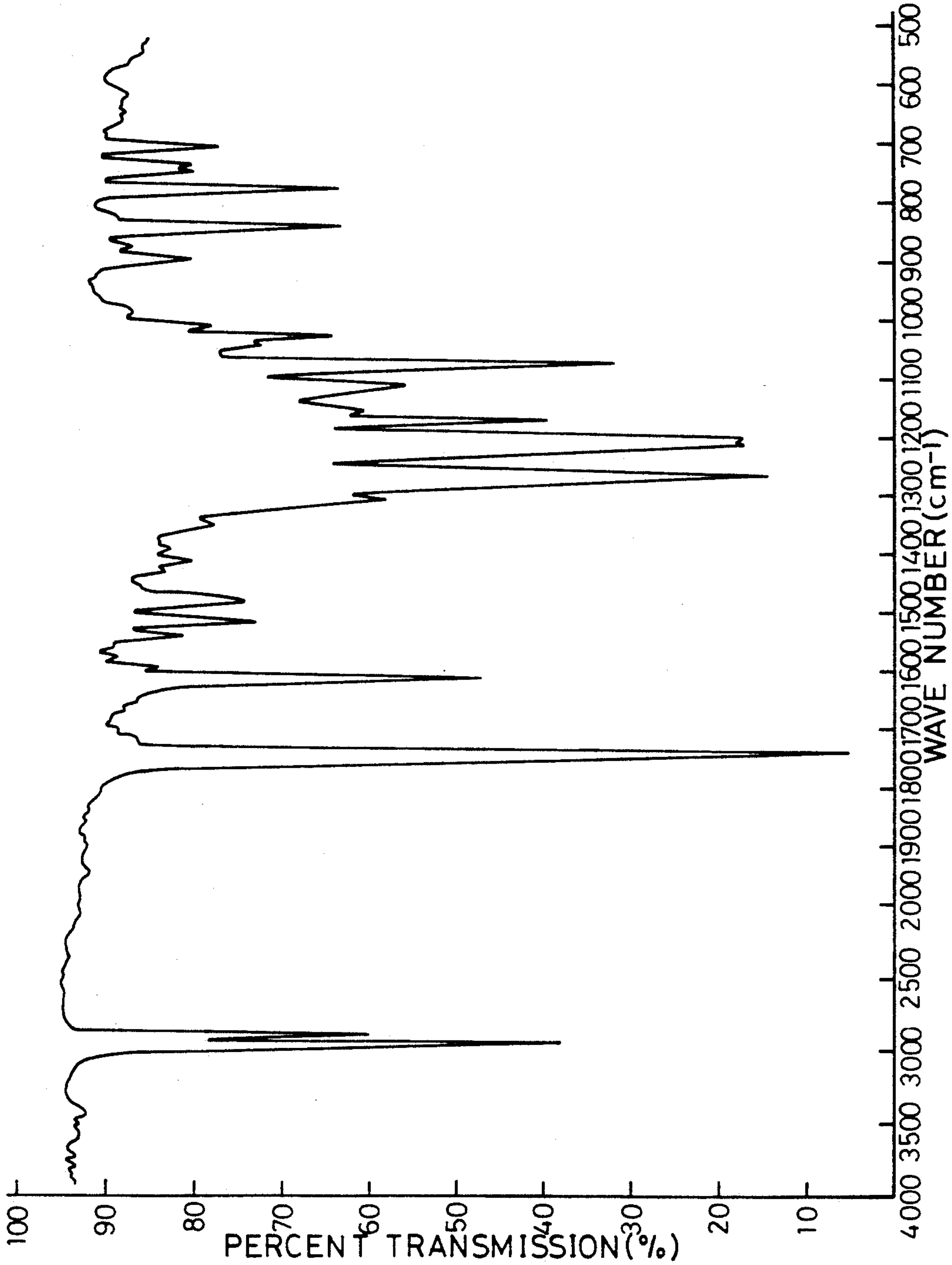

An infrared absorption spectrum thereof is shown in FIG. 10.

EXAMPLE 11

Synthesis of 4-(1,1,1,2,2-pentafluoro-3-undecyloxycarbonyl)-phenyl-4'-n-octyloxybiphenyl-4-carboxylate

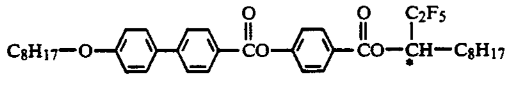

In stead of 1,1,1-trifluoro-2-octanol used in Example 1-(1), (−)-1,1,1,2,2-pentafluoro-3-undecanol was used and the other treatments were carried out just same as in Example 1 to obtain the above objective compound.

This compound has following tristable phase transition points.

$$Cry \xleftarrow[38.8]{} S(3)^{*} \xleftarrow[70.0]{} S_C^{*} \xleftarrow[76.8]{} S_A \xleftarrow[85.5]{} Iso$$

Figure 11:
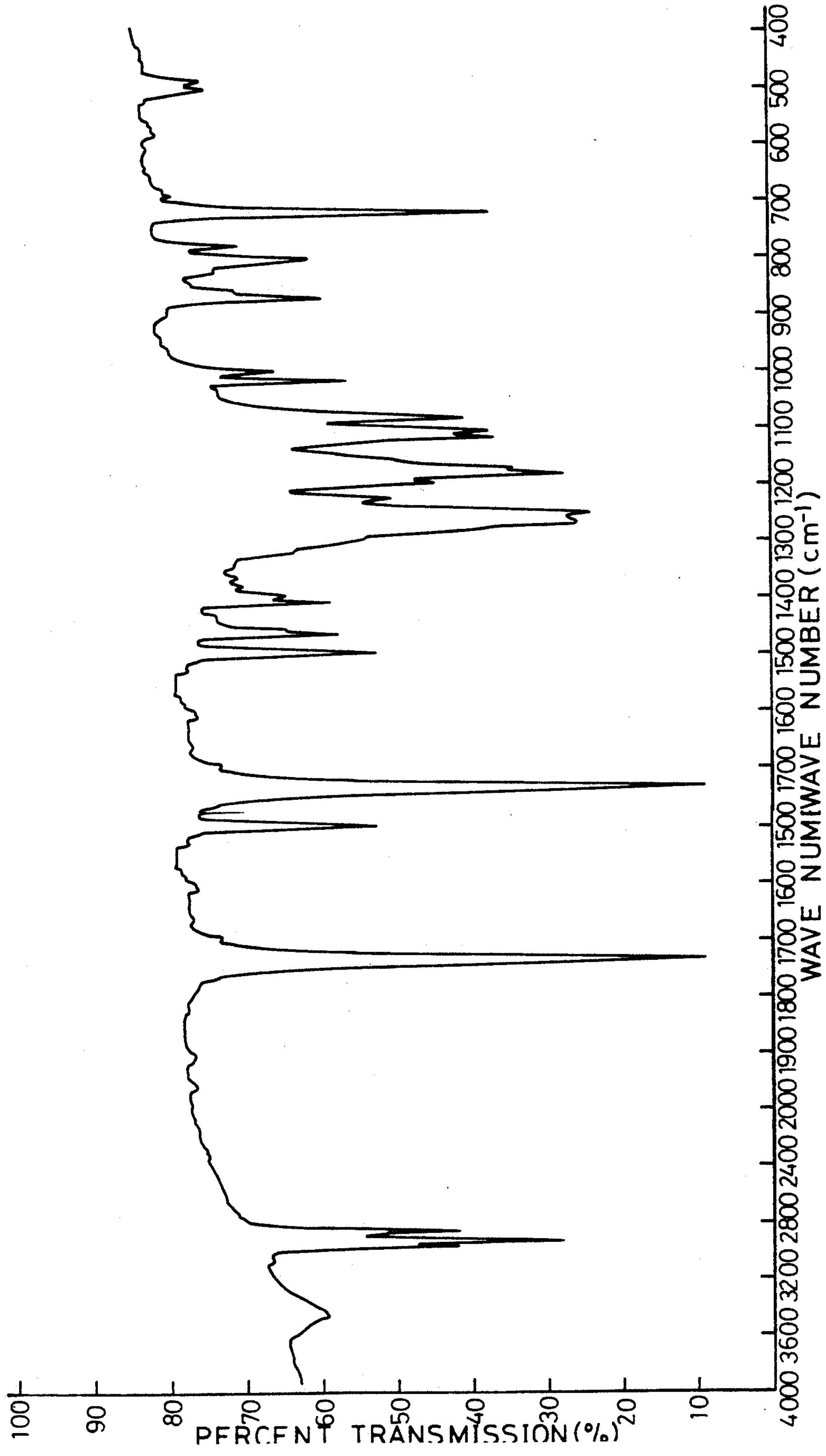

An infrared absorption spectrum thereof is shown in FIG. 11.

EXAMPLE 12

1) Synthesis of 4-octyl-biphenyl-4'-terephthalic acid chloride

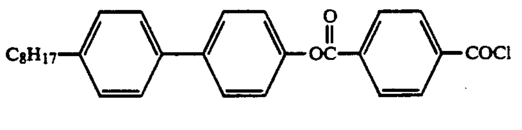

A solution prepared by taking 0.5 g of 4-hydroxy-4'-octylbiphenyl and 0.36 g of terephthaloyl chloride in about 30 ml of dichloromethane and stirring, is droppingly added with 0.2 g of triethylamine, then added with 0.013 g of dimethylaminopyridine and stirred at the room temperature for 10 hours to obtain the reaction product as above.

2) Synthesis of 4-n-octylbiphenyl-4-(1,1,1-trifluoro-2-octyloxycarbonyl)benzoate

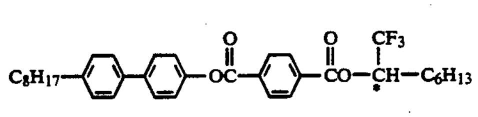

The above reaction product was added with 0.32 g of (+)-1,1,1-trifluorooctanol, droppingly added with 0.2 g of triethylamine, further added with 0.013 g of dimethylaminopyridine and stirred at the room temperature for about 10 hours. After filtering unsoluble contents off, the filtrate was neutralized and extracted with water/dichloromethane. By distillizing water and the solvent off, the crude objective compound was obtained in the amount of 0.8 g, which was purified by silica gel chromatography with ethanol to obtain the objective liquid crystal in the amount of 0.2 g.

The above compound showed phase transition points as follows.

$$Cry \underset{25}{\overset{69}{\rightleftharpoons}} S_A \underset{114}{\overset{113}{\rightleftharpoons}} Iso$$

A nuclear magnetic resonance spectrum and an infrared absorption spectrum thereof are respectively shown in Table 7 and FIG. 11.

EXAMPLE 13

Synthesis of 4-(1,1,1-trifluoro-2-octyloxycarbonyl)-biphenyl-4-n-octylbenzoate

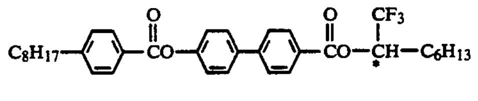

In the presence of 0.3 g of dicyclocarbodiimide, a few pieces of dimethylaminopyridine and 30 ml of tetrahydrofuran, 0.5 g of 4-(1,1,1-trifluoro-2-octyloxycarbonyl) phenylphenol was reacted with 0.31 g of octylbenzoate to obtain the crude objective compound, which was purified by toluene/silica gel chromatography with hexane/ethyl acetate (10/0.5) and recrystallization with ethanol to obtain the objective compound in the amount of 0.1 g.

The liquid crystal has following tristable phase transition points.

$$Cry \xleftarrow[-20]{} S(3)^{*} \xleftarrow[38]{} S_C^{*} \xleftarrow[40]{} S_A \xleftarrow[61.9]{} Iso$$

Figure 12:
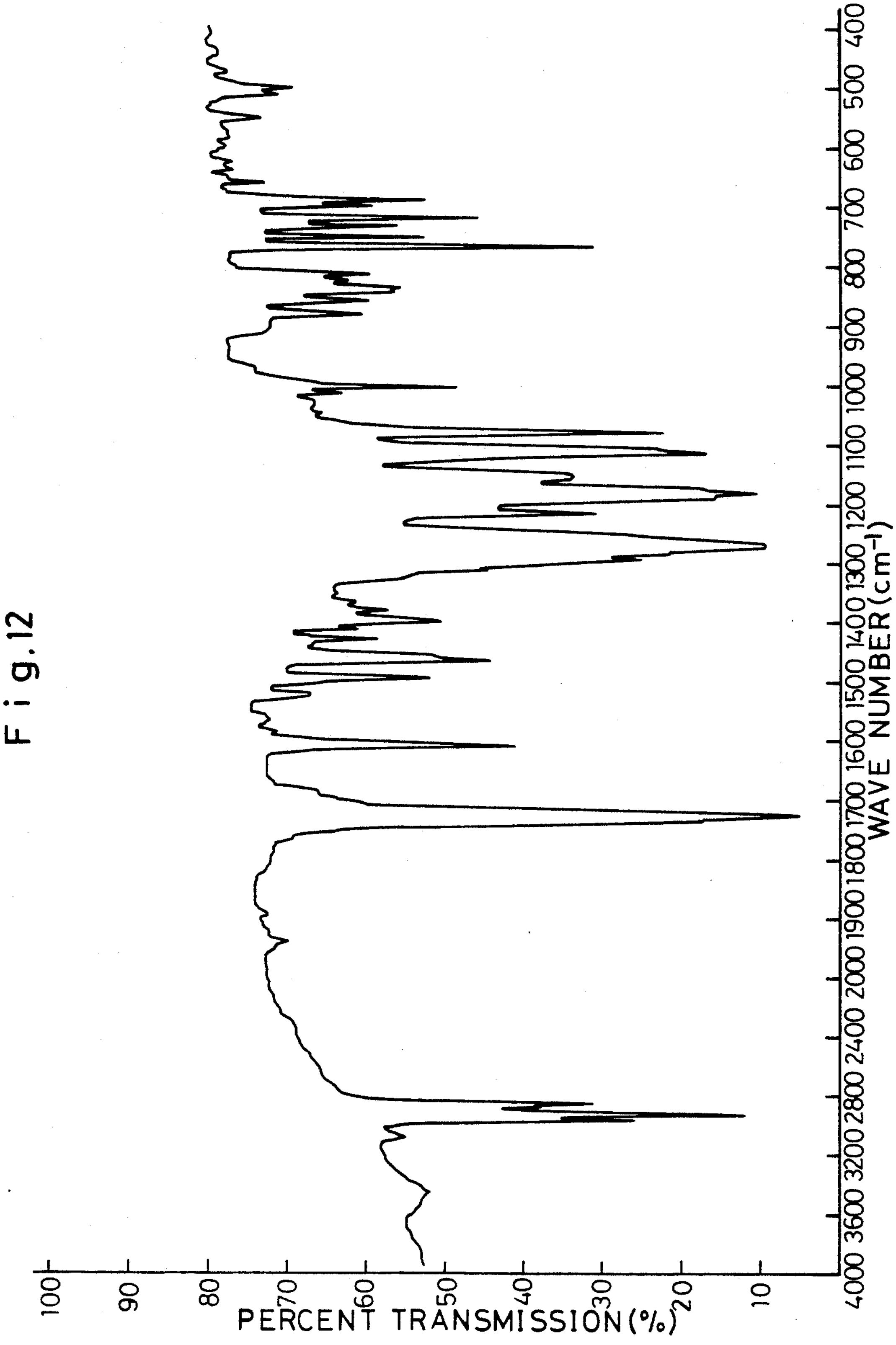

A nuclear magnetic resonance spectrum and an infrared absorption spectrum thereof are respectively shown in Table 8 and FIG. 12.

TABLE 1

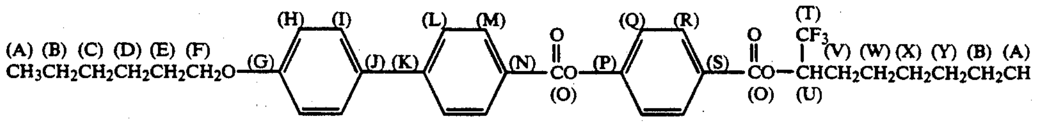

| Carbon | ppm | Remarks | Carbon | ppm | Remarks |
|---|---|---|---|---|---|
| A | 14.0 | Methyl Carbon | O | 164.3 | Carbonyl Carbon |
| B | 22.5 | Methylene Carbon | P | 155.4 | Aromatic Ring Carbon Adjacent 0 |
| C | 31.6 | " | Q | 122.0 | Aromatic Ring Carbon Adjacent 0 |
| D | 25.8 | " | R | 131.6 | " |
| E | 29.3 | " | S | 126.4 | Aromatic Ring Carbon Adjacent to Carbonyl |
| F | 68.2 | Methylene Carbon Adjacent to 0 | T | 124.1 | F3 Substituted Methyl Carbon |
| G | 159.7 | Aromatic Ring Carbon Adjacent to 0 | U | 70.3 | Methine Carbon Adjacent to F3 Substituted Methyl |
| H | 115.0 | Aromatic Ring Carbon | V | 28.2 | Mehtylene Carbon |
| I | 128.4 | " | W | 24.6 | " |
| J | 131.8 | " | X | 28.8 | " |
| K | 146.4 | " | Y | 31.4 | " |
| L | 126.6 | " | | | |
| M | 130.7 | " | | | |
| N | 126.9 | Aromatic Ring Carbon Adjacent to Carbonyl | | | |

TABLE 2

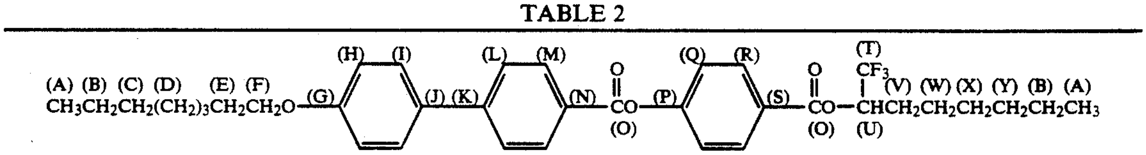

| Carbon | ppm | Remarks | Carbon | ppm | Remarks |
|---|---|---|---|---|---|
| A | 14.0 | Methyl Carbon | O | 164.3 | Carbonyl Carbon |
| B | 22.6 | Methylene Carbon | P | 155.4 | Aromatic Ring Carbon Adjacent 0 |
| C | 31.9 | " | Q | 122.0 | Aromatic Ring Carbon Adjacent 0 |
| D | 29.5 | " | R | 131.6 | " |
| E | 26.1 | " | S | 126.4 | Aromatic Ring Carbon Adjacent to Carbonyl |
| F | 68.2 | Methylene Carbon Adjacent to 0 | T | 124.1 | F3 Substituted Methyl Carbon |
| G | 159.7 | Aromatic Ring Carbon Adjacent to 0 | U | 70.3 | Methine Carbon Adjacent to F3 Substituted Methyl |
| H | 115.1 | Aromatic Ring Carbon | V | 28.1 | Methylene Carbon |
| I | 128.4 | " | W | 24.6 | " |
| J | 131.8 | " | X | 28.8 | " |
| K | 146.4 | " | Y | 31.5 | " |
| L | 126.6 | " | | | |
| M | 130.7 | " | | | |
| N | 126.9 | Aromatic Ring Carbon Adjacent to Carbonyl | | | |

TABLE 3

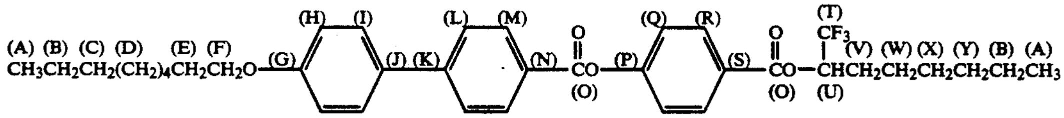

| Carbon | ppm | Remarks | Carbon | ppm | Remarks |
|---|---|---|---|---|---|
| A | 14.0 | Methyl Carbon | O | 164.2 | Carbonyl Carbon |
| B | 22.6 | Methyl Carbon | P | 155.4 | Aromatic Ring Carbon Adjacent 0 |
| C | 32.0 | " | Q | 122.0 | Aromatic Ring Carbon Adjacent 0 |
| D | 29.5 | " | R | 131.6 | " |
| E | 26.2 | " | S | 126.4 | Aromatic Ring Carbon Adjacent to Carbonyl |
| F | 68.2 | Methylene Carbon Adjacent to 0 | T | 124.1 | F3 Substituted Methyl Carbon |
| G | 159.7 | Aromatic Ring Carbon Ajacent to 0 | U | 70.4 | Methine Carbon Adjacent to F3 Substituted Methyl |
| H | 115.1 | Aromatic Ring Carbon | V | 28.1 | Methylene Carbon |
| I | 128.3 | " | W | 24.6 | " |
| J | 131.8 | " | X | 28.8 | " |
| K | 146.4 | " | Y | 31.5 | " |
| L | 126.6 | " | | | |
| M | 130.7 | " | | | |
| N | 126.9 | Aromatic Ring Carbon Adjacent | | | |

TABLE 3-continued

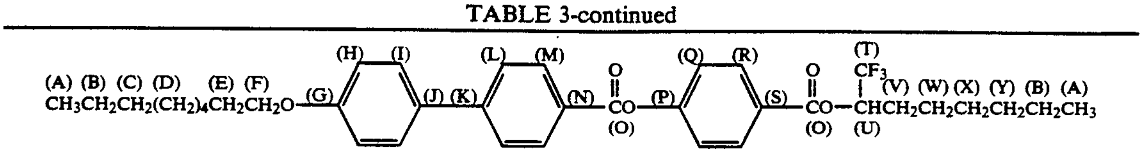

| Carbon | ppm | Remarks | Carbon | ppm | Remarks |
|---|---|---|---|---|---|
| | | to Carbonyl | | | |

TABLE 4

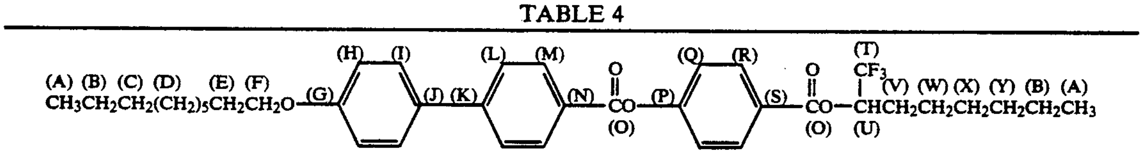

| Carbon | ppm | Remarks | Carbon | ppm | Remarks |
|---|---|---|---|---|---|
| A | 14.0 | Methyl Carbon | O | 164.3 | Carbonyl Carbon |
| B | 22.6 | Methyl Carbon | P | 155.4 | Aromatic Ring Carbon Adjacent 0 |
| C | 32.0 | " | Q | 122.0 | Aromatic Ring Carbon Adjacent 0 |
| D | 29.5 | " | R | 131.6 | " |
| E | 26.1 | " | S | 126.4 | Aromatic Ring Carbon Adjacent to Carbonyl |
| F | 68.2 | Methylene Carbon Adjacent to 0 | T | 124.0 | F3 Substituted Methyl Carbon |
| G | 159.7 | Aromatic Ring Carbon Ajacent to 0 | U | 70.4 | Methine Carbon Adjacent to F3 Substituted Methyl |
| H | 115.1 | Aromatic Ring Carbon | V | 28.2 | Methylene Carbon |
| I | 128.3 | " | W | 24.6 | " |
| J | 131.7 | " | X | 28.8 | " |
| K | 146.3 | " | Y | 31.5 | " |
| L | 126.6 | " | | | |
| M | 130.8 | " | | | |
| N | 126.9 | Aromatic Ring Carbon Adjacent to Carbonyl | | | |

TABLE 5

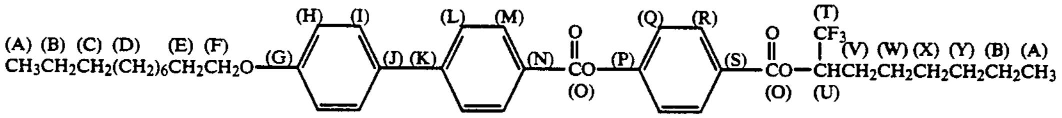

| Carbon | ppm | Remarks | Carbon | ppm | Remarks |
|---|---|---|---|---|---|
| A | 14.0 | Methyl Carbon | O | 164.3 | Carbonyl Carbon |
| B | 22.6 | Methyl Carbon | P | 155.3 | Aromatic Ring Carbon Adjacent 0 |
| C | 31.9 | " | Q | 122.0 | Aromatic Ring Carbon Adjacent 0 |
| D | 29.5 | " | R | 131.6 | " |
| E | 26.1 | " | S | 126.3 | Aromatic Ring Carbon Adjacent to Carbonyl |
| F | 68.2 | Methylene Carbon Adjacent to 0 | T | 124.0 | F3 Substituted Methyl Carbon |
| G | 159.7 | Aromatic Ring Carbon Ajacent to 0 | U | 70.3 | Methine Carbon Adjacent to F3 Substituted Methyl |
| H | 115.0 | Aromatic Ring Carbon | V | 28.1 | Methylene Carbon |
| I | 128.3 | " | W | 24.5 | " |
| J | 131.8 | " | X | 28.8 | " |
| K | 146.3 | " | Y | 31.4 | " |
| L | 126.6 | " | | | |
| M | 130.7 | " | | | |
| N | 126.9 | Aromatic Ring Carbon Adjacent to Carbonyl | | | |

TABLE 6

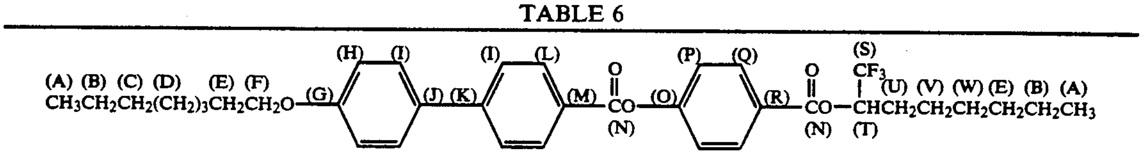

| Carbon | ppm | Remarks | Carbon | ppm | Remarks |
|---|---|---|---|---|---|
| A | 14.0 | Methyl Carbon | O | 155.4 | Aromatic Ring Carbon Adjacent 0 |
| B | 22.6 | Methylene Carbon | P | 122.0 | Aromatic Ring Carbon |
| C | 31.9 | " | Q | 131.6 | " |

TABLE 6-continued

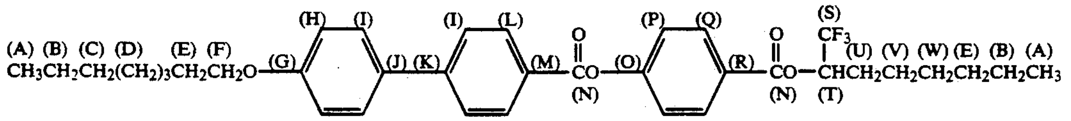

| Carbon | ppm | Remarks | Carbon | ppm | Remarks |
|---|---|---|---|---|---|
| D | 29.5 | " | R | 126.4 | Aromatic Ring Carbon Adjacent to Carbonyl |
| E | 31.5 | " | S | 124.0 | F3 Substituted Methyl Carbon |
| F | 35.7 | Methylene Carbon Adjacent to Aromatic Ring | T | 70.3 | Methine Carbon Adjacent to F3 Substituted Methyl |
| G | 143.5 | Aromatic Ring Carbon Adjacent to Methylene | U | 28.1 | Methylene Carbon |
| H | 129.0 | Aromatic Ring Carbon | V | 24.6 | " |
| I | 127.1 | " | W | 28.8 | " |
| J | 137.0 | " | | | |
| K | 146.7 | " | | | |
| L | 130.7 | " | | | |
| M | 127.4 | Aromatic Ring Carbon Adjacent to Carbonyl | | | |
| N | 164.3 | Carbonyl Carbon | | | |

TABLE 7

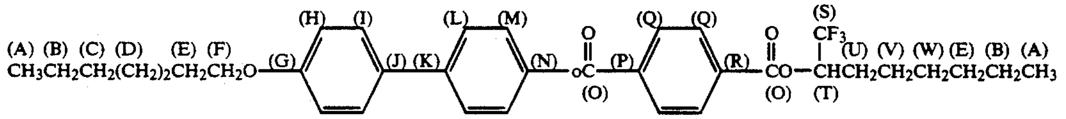

| Carbon | ppm | Remarks | Carbon | ppm | Remarks |
|---|---|---|---|---|---|
| A | 14.0 | Methyl Carbon | O | 164.1 | Ester Carbon |
| B | 22.6 | Methylene Carbon | P | 134.1 | Aromatic Ring Carbon Adjacent to Carbonyl |
| C | 31.9 | " | Q | 130.1 | Aromatic Ring Carbon |
| D | 29.4 | " | R | 133.1 | Aromatic Ring Carbon Adjacent to Carbonyl |
| E | 31.4 | " | S | 123.9 | F3 Substituted Methyl Carbon |
| F | 35.6 | " | T | 70.3 | Methine Carbon Adjacent to F3 Substituted Methyl |
| G | 142.2 | Aromatic Ring Carbon | U | 28.1 | Methylene Carbon |
| H | 128.8 | Aromatic Ring Carbon | V | 24.5 | " |
| I | 126.9 | " | W | 28.9 | " |
| J | 137.5 | " | | | |
| K | 139.3 | " | | | |
| L | 128.0 | " | | | |
| M | 121.6 | " | | | |
| N | 150.0 | Aromatic Ring Carbon Adjacent to 0 | | | |

TABLE 8

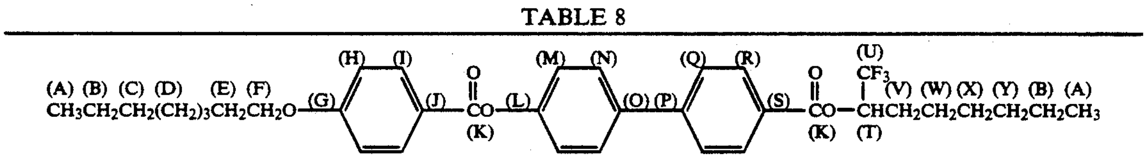

| Carbon | ppm | Remarks | Carbon | ppm | Remarks |
|---|---|---|---|---|---|
| A | 14.0 | Methyl Carbon | O | 137.4 | Aromatic Ring Carbon |
| B | 22.6 | Methylene Carbon | P | 145.6 | " |
| C | 31.9 | " | Q | 127.1 | " |
| D | 29.4 | " | R | 130.5 | " |
| E | 31.2 | " | S | 127.6 | " |
| F | 36.1 | Methylene Carbon Adjacent to Aromatic Ring | T | 70.3 | Methine Carbon Adjacent to F3 Substituted Methyl |
| G | 149.5 | Aromatic Ring Carbon Adjacent to Methylene | U | 124.0 | F3 Substituted Methyl Carbon |
| H | 128.6 | Aromatic Ring Carbon | V | 28.1 | Methylene Carbon |
| I | 130.2 | " | W | 24.6 | " |
| J | 126.8 | " | X | 28.8 | " |
| K | 164.9 | " | Y | 31.4 | " |
| L | 151.3 | Aromatic Ring Carbon Adjacent O | | | |
| M | 122.3 | Aromatic Ring Carbon | | | |

TABLE 8-continued
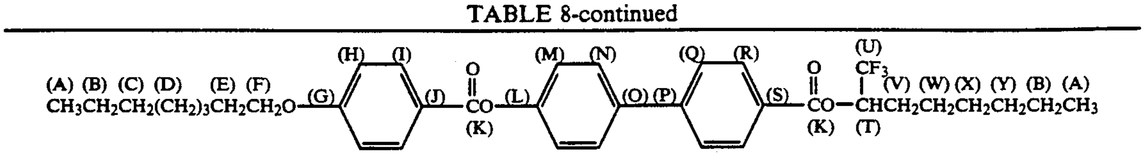
| Carbon | ppm | Remarks | Carbon | ppm | Remarks |
|---|---|---|---|---|---|
| N | 128.3 | " | | | |
What is claimed is:
1. A liquid crystal compound which has the following formula:
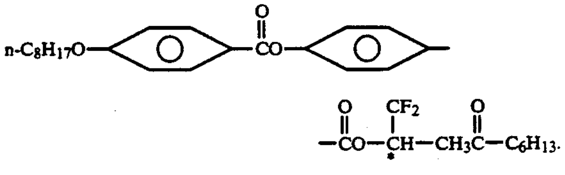
* * * * *